(12) United States Patent
Travis

(10) Patent No.: US 8,851,822 B2
(45) Date of Patent: Oct. 7, 2014

(54) SEED CART

(75) Inventor: Wyman Travis, Curlew, IA (US)

(73) Assignee: C & B Manufacturing, Jackson, MN (US)

( * ) Notice: Subject to any disclaimer, the term of this patent is extended or adjusted under 35 U.S.C. 154(b) by 986 days.

(21) Appl. No.: 12/372,021

(22) Filed: Feb. 17, 2009

(65) Prior Publication Data

US 2010/0209224 A1 Aug. 19, 2010

(51) Int. Cl.
*B60P 1/00* (2006.01)
*A01C 7/20* (2006.01)
*A01C 15/00* (2006.01)

(52) U.S. Cl.
CPC .............. *A01C 7/208* (2013.01); *A01C 15/003* (2013.01)
USPC ............................................ 414/526; 414/21

(58) Field of Classification Search
USPC ......... 414/539, 332, 334, 403, 404, 408, 415, 414/507, 526, 523, 21; 198/550.01, 550.2, 198/532, 530; 111/173
See application file for complete search history.

(56) References Cited

U.S. PATENT DOCUMENTS

| | | | |
|---|---|---|---|
| 2,299,702 A | 10/1942 | Mosel | |
| 2,675,947 A | 4/1954 | Wynn | |
| 3,083,879 A | 4/1963 | Coleman | |
| 3,883,005 A | 5/1975 | Stevens | |
| 3,997,215 A * | 12/1976 | Parker et al. | 298/24 |
| 4,071,226 A * | 1/1978 | Miller | 366/64 |
| 4,302,043 A | 11/1981 | Dimmer | |
| 4,768,884 A | 9/1988 | Elkin | |
| 5,094,356 A | 3/1992 | Miller | |
| 5,468,113 A * | 11/1995 | Davis | 414/523 |
| 5,718,555 A * | 2/1998 | Swalheim | 414/502 |
| 5,785,481 A * | 7/1998 | Ockels | 414/523 |
| 5,845,799 A | 12/1998 | Deaton | |
| 5,924,758 A | 7/1999 | Dimmer | |
| 6,010,022 A | 1/2000 | Deaton | |
| 6,092,974 A * | 7/2000 | Roth | 414/526 |
| 6,120,233 A * | 9/2000 | Adam | 414/502 |
| 6,328,183 B1 | 12/2001 | Coleman | |
| 6,396,003 B1 * | 5/2002 | Friesen | 177/136 |
| 6,513,856 B1 | 2/2003 | Swanson | |
| 6,964,551 B1 | 11/2005 | Friesen | |

(Continued)

OTHER PUBLICATIONS

Seed Container Spec Sheet, RPP Containers, Cincinnati, OH.

(Continued)

*Primary Examiner* — Saul Rodriguez
*Assistant Examiner* — Glenn Myers
(74) *Attorney, Agent, or Firm* — Jeffrey A. Proehl; Woods, Fuller, Shultz & Smith, P.C.

(57) ABSTRACT

A vehicle for transporting bulk seed containers and for transferring seed from the bulk seed containers to a seed planting machine includes a frame; a number of bulk seed container supports attached to the frame, each bulk seed container support supporting a bulk seed container; a feed tube connected to each of the bulk seed container supports, each feed tube engaging a bulk seed container; a delivery tube connected to each feed tube; a funnel commonly connected to the delivery tubes; an auger tube connected to the funnel, and an auger to transfer seed to a seed planting machine.

17 Claims, 8 Drawing Sheets

(56) References Cited

U.S. PATENT DOCUMENTS

| | | | |
|---|---|---|---|
| 6,971,324 B1 * | 12/2005 | Beck | 111/200 |
| 6,994,039 B1 * | 2/2006 | Beck | 111/200 |
| 2002/0139817 A1 | 10/2002 | Travis | |
| 2004/0179929 A1 * | 9/2004 | Van Mill | 414/526 |
| 2005/0252999 A1 | 11/2005 | Truan | |
| 2006/0180062 A1 * | 8/2006 | Furrer et al. | 111/171 |
| 2007/0005186 A1 * | 1/2007 | Wietgrefe | 700/236 |

OTHER PUBLICATIONS

Center Flow Bulk Container, brochure, Buckhorn, Inc.

Travis Seed Cart, web page, www.hitchdoc.com/travisseedcart.php, accessed Jul. 23, 2009.

PROBOX Seed Handling System, Pioneer Hi-Bred, www.pioneer.com, accessed Jul. 23, 2009.

* cited by examiner

SEED CART

FIELD OF THE INVENTION

This invention relates to a seed cart, in particular a seed cart for use with agricultural planting machines such as corn planters. The seed cart is configured to discharge seed from multiple bulk seed containers and other agricultural products, and includes an auger off-loading ability to a planter or other agricultural equipment.

BACKGROUND OF THE INVENTION

Agricultural plating machines have grown considerably in size and complexity. Modern machines are presently configured to store and dispense great quantities of seed to facilitate long periods of operation. However, seed for such machines traditionally is sold and distributed in relatively small quantities.

In the past, seed was distributed in 50 lb. bags, and more recently larger "jumbo" bags have been used. The bag concept suffers from a number of drawbacks. The smaller bags are too small to efficiently load a modern planting machine. The larger bags are too heavy to by handled without specialized equipment, and even with equipment they are considered dangerous due to the size and nature of the jumbo bags.

Recently, in part to remedy these problems, seed has been packaged in box like bulk seed containers such as the Pro-Box. While addressing the safety issues, these containers are not easy to handle and a means to deliver the seed in large quantity to the planters still exists.

A results a number of manufacturers have begun to produce specialized carts for handling this bulk seed, which can transport the seed to the planters often in field. These type of carts, however, for the most part resemble traditional bin type grain carts, which are not particularly well suited for use the bulk seeds containers. For example, the heavy bulk bags must be loaded with a fork lift, or crane, which makes field operation impractical to impossible. In most cases, the seed must be unloaded from the bag or container and dumped into the seed cart bin, which as stated depending on the circumstances can range from difficult to impossible.

Accordingly, plainly a need exists for an improved bulk seed cart which can eliminate or substantially eliminate the problems in the art.

SUMMARY OF THE INVENTION

An object of the present invention is to provide a seed cart which provides improved support for a number of bulk seed containers.

Another object of the present invention is to provide a seed cart which allows seed to be readily transported from the seed cart to a seed planter.

These and other objects of the present invention will become apparent to those skilled in the art upon reference to the following specification, drawings, and claims.

BRIEF DESCRIPTION OF DRAWINGS

FIG. 3b is an exploded view of the talc kit of FIG. 3a.

DETAILED DESCRIPTION OF THE PREFERRED EMBODIMENTS

Figure 1:
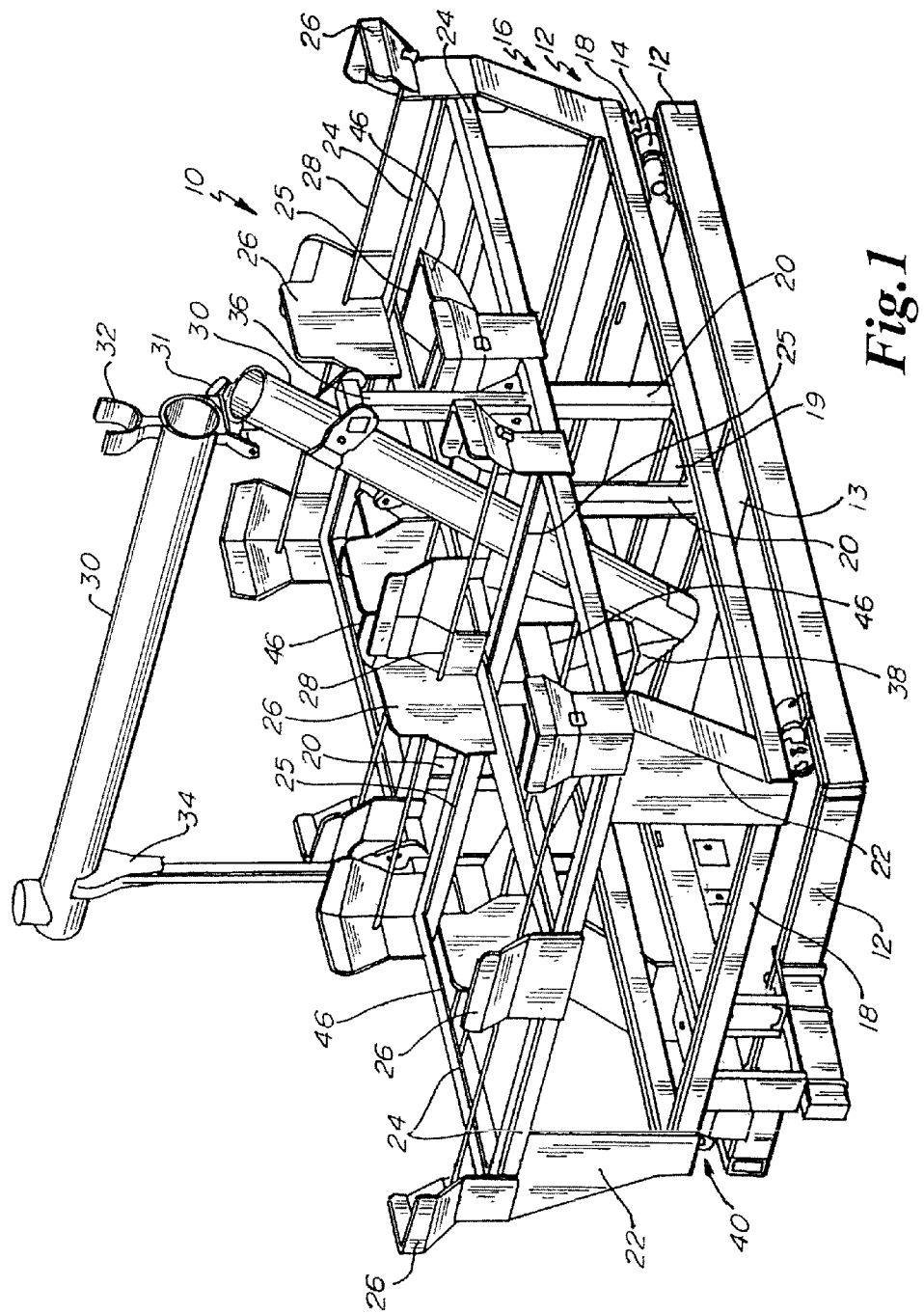
FIG. 1 is a perspective view of a first embodiment of the seed cart of the present invention.
Figure 2:
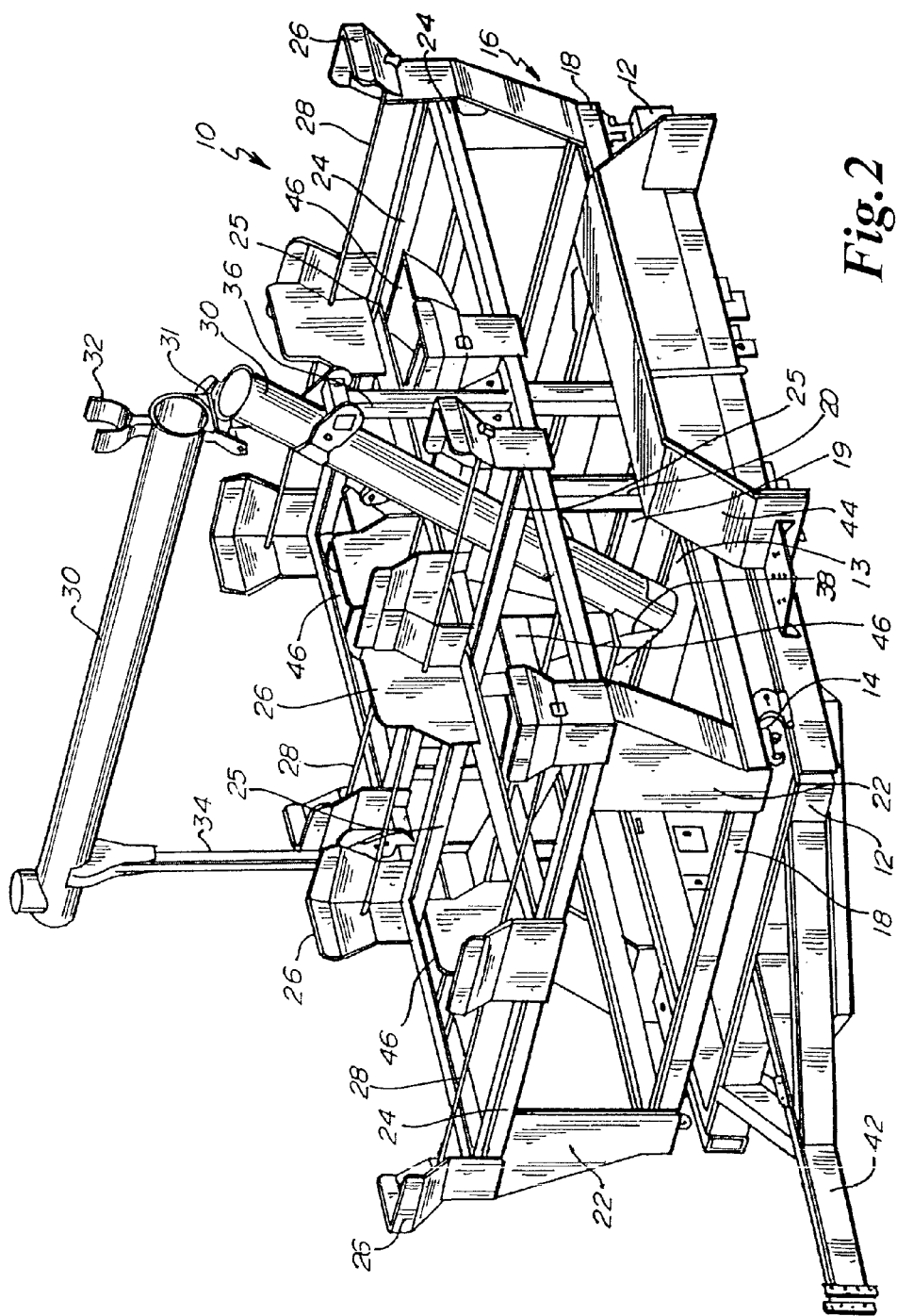
FIG. 2 is a perspective view of a second embodiment of the seed cart of the present invention.
Figure 4:
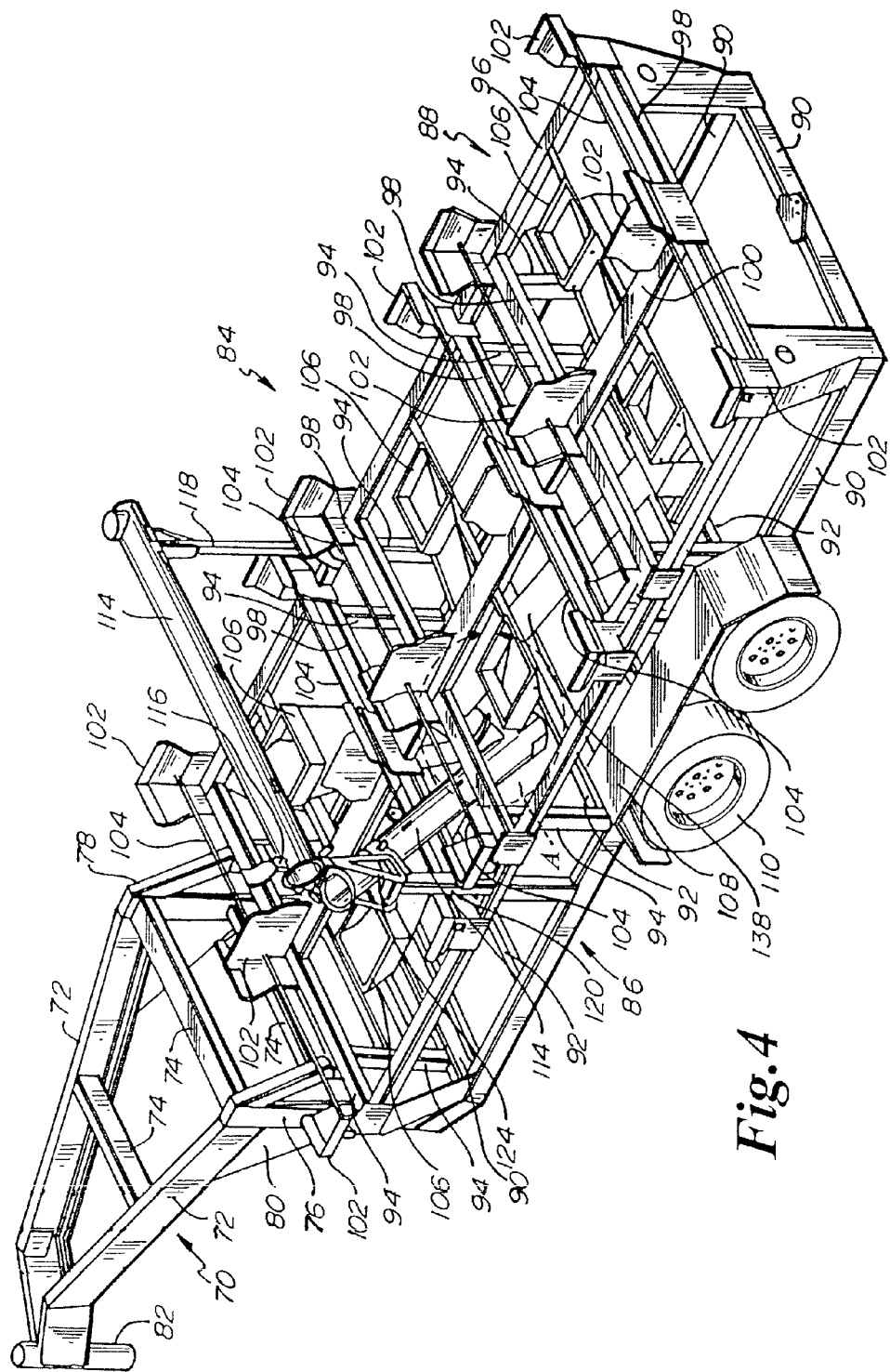
FIG. 4 is a perspective view of a third embodiment of the seed cart of the present invention.
Figure 5:
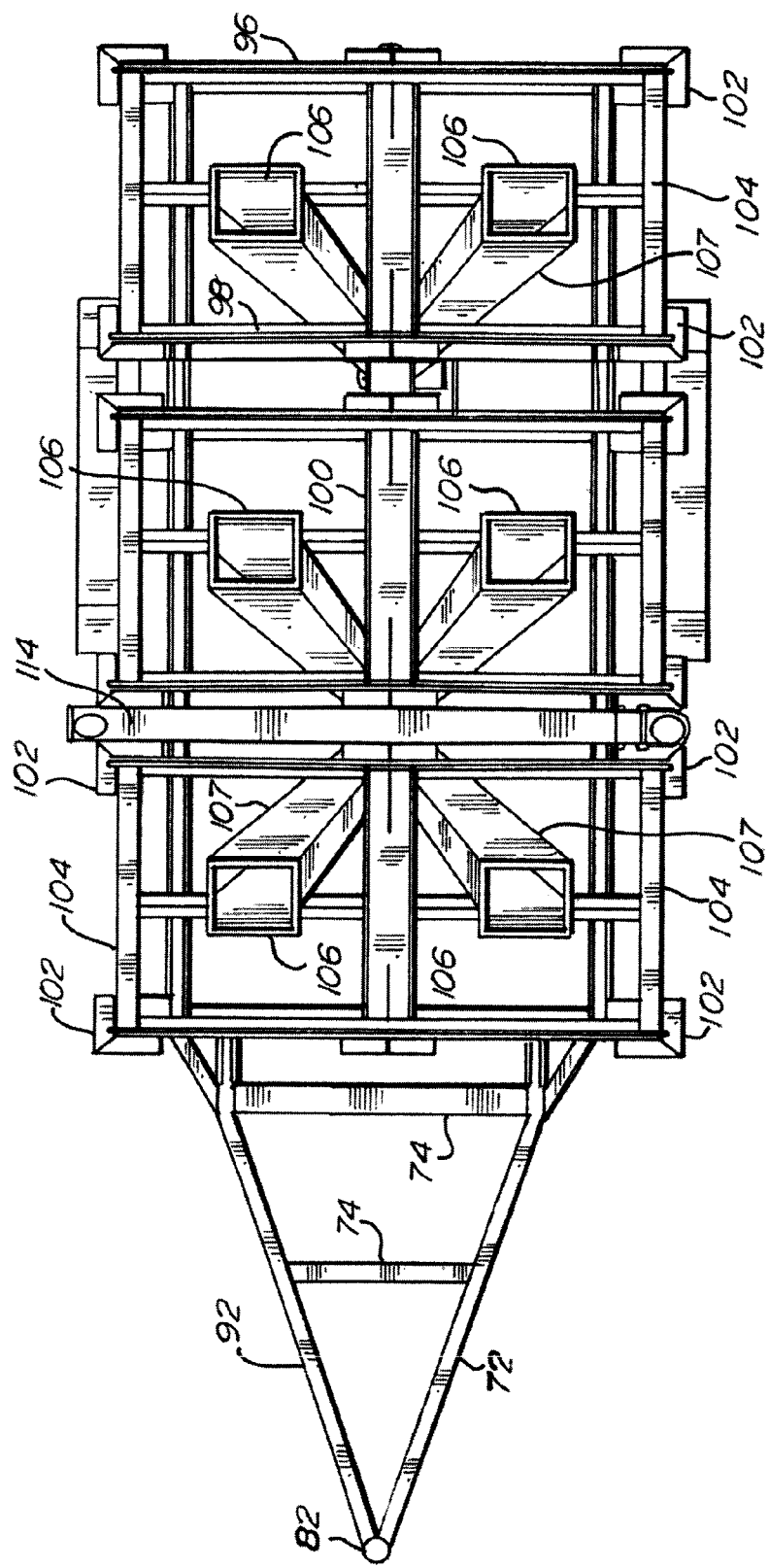
FIG. 5 is a top plan view of the embodiment of FIG. 4.
Figure 6:
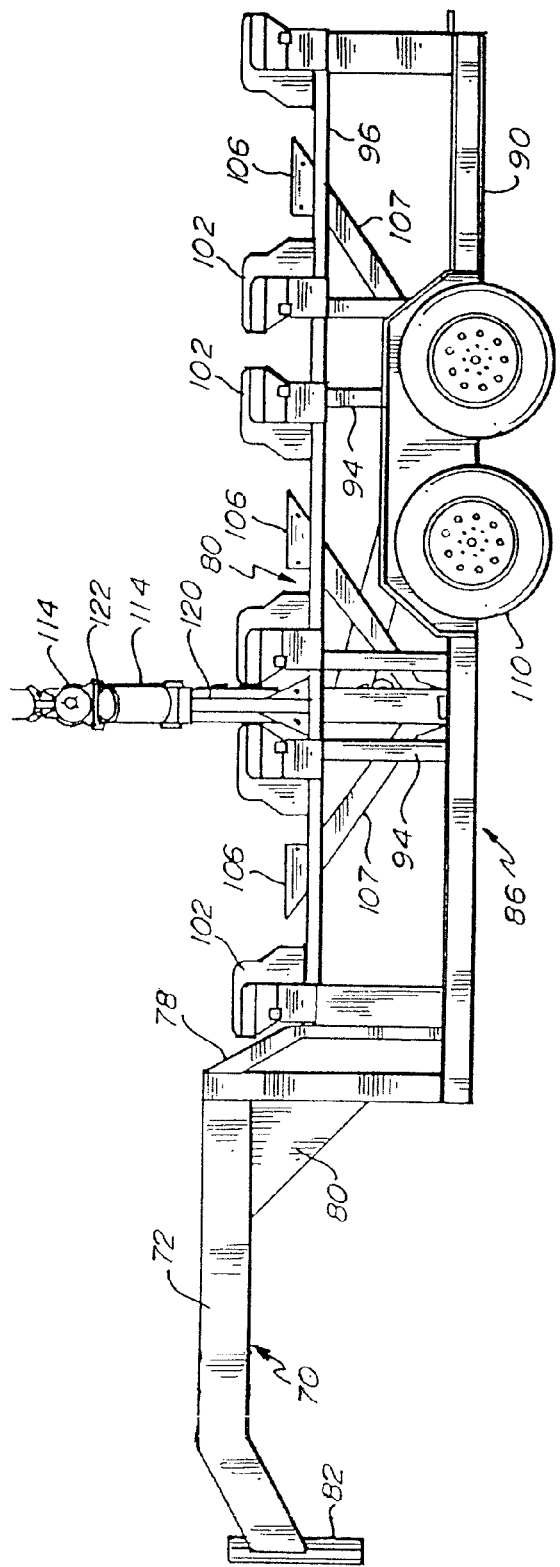
FIG. 6 is an elevational view of the embodiment of FIG. 4.
Figure 7:
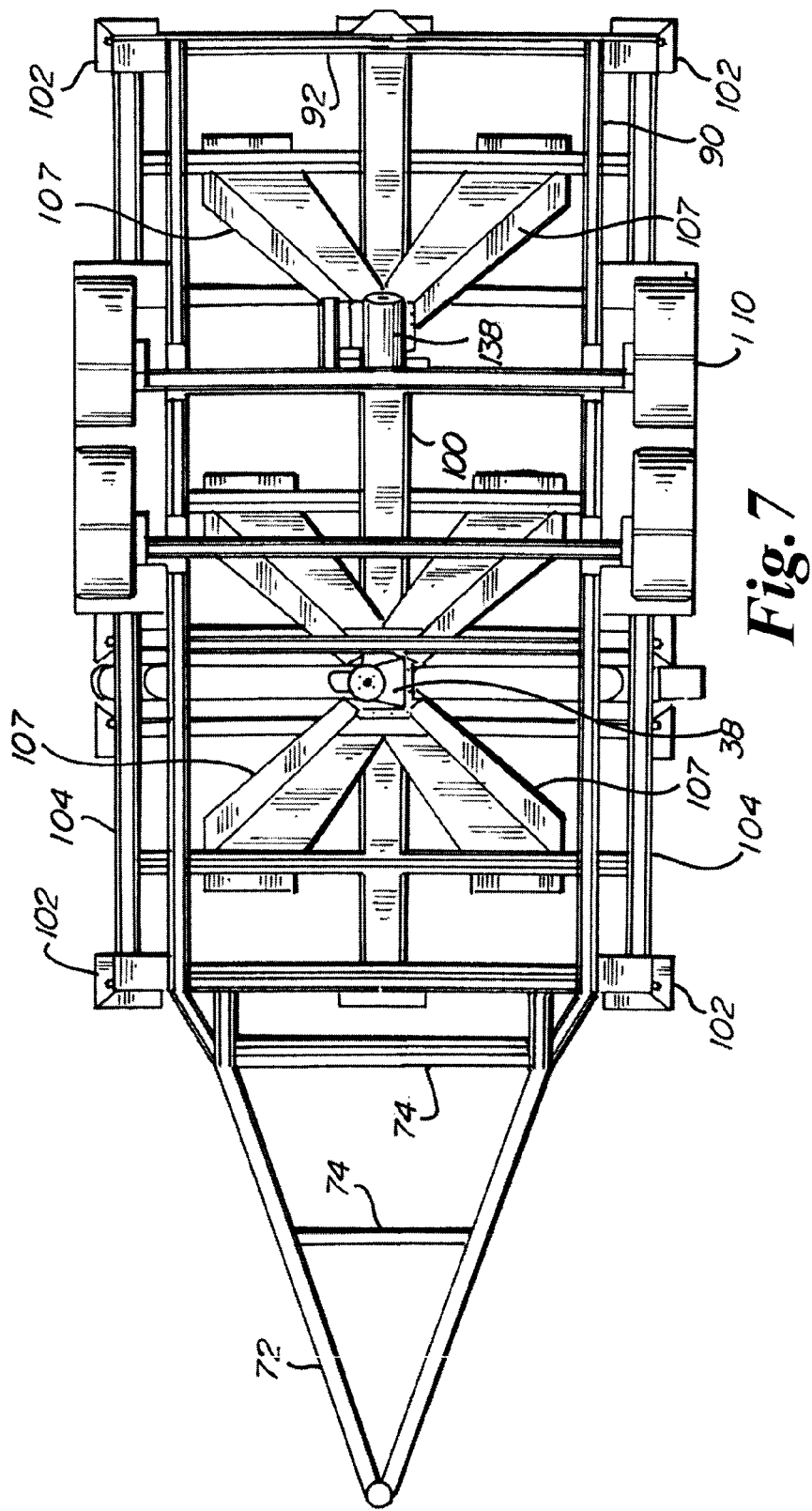
FIG. 7 is a bottom plan view of the embodiment of FIG. 4.
Figure 9:
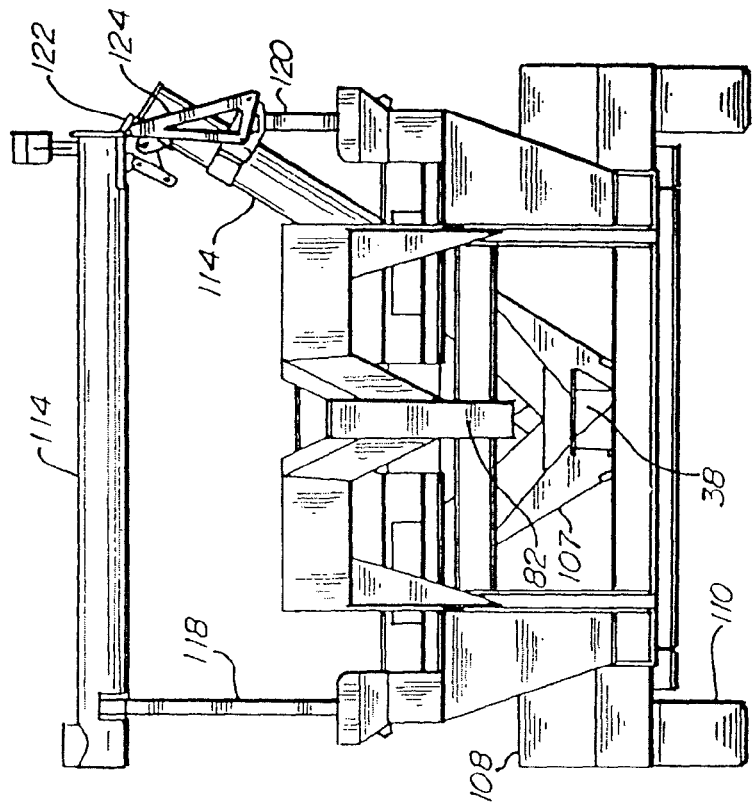
FIG. 9 is a front elevational view of an embodiment of the seed cart of the present invention.
Figure 8:
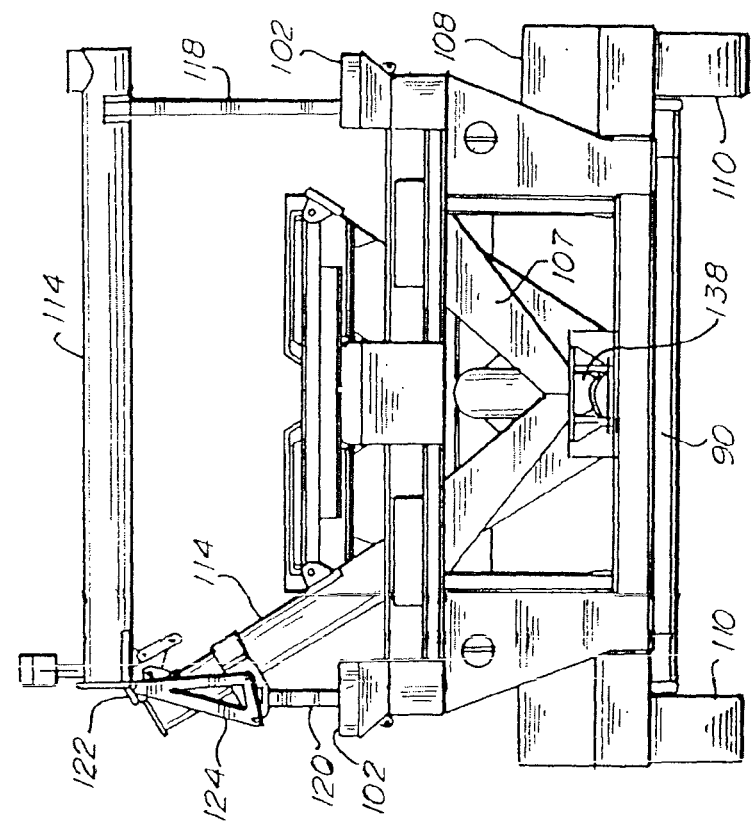
FIG. 8 is a rear elevational view of an embodiment of the seed cart of the present invention.

In the Figures, a seed cart 10 is shown. FIG. 1 shows the seed cart 10 configured to receive four bulk seed containers (not shown) such as Pro-Box bulk seed containers. The seed cart 10 shown in FIG. 1 is adapted for mounting to a trailer. FIG. 2 shows a seed cart 10 also configured to receive four bulk seed containers, and is adapted as a stand-alone trailer with capability of receiving wheels (not shown) and a trailer hitch (not shown). FIG. 4 shows a seed cart 10 configured to receive six bulk seed containers and a yoke with a hitch pin adapted for connecting to a truck (not shown).

In particular, as shown in FIG. 1, the seed cart 10 includes a lower frame 11 comprised of a plurality of perimeter frame members 12 and a transverse frame member 13. The lower frame supports an upper frame 16. Conventionally available weigh bars 14 are located between the lower and upper frames 11, 16. The weigh bars 14 are used to determine the amount of seed remaining in the seed cart 10 bulk seed containers, and include a digital readout for this purpose.

The upper frame 16 includes a base 17 which is comprised of a plurality of lower perimeter frame members 18 and a lower transverse frame member 19. Supports 20 extend upward from either side of the seed cart 12 and are connected on their lower end to the lower perimeter frame members 18 of the base 17 and connect on the upper end to upper perimeter frame members 24 of the upper frame 16. The upper perimeter frame members 24 are joined together to form the upper perimeter of the upper frame 16. Inner upper support members 25 are joined to the upper perimeter frame members 24 of the upper frame 16 for lateral support and to complete inner perimeters upon which the four bulk seed containers rest.

Further support to the upper frame 16 is provide by a plurality of corner panel supports 22 located in each corner for the upper frame 16 of the seed cart 12. The corner panel supports 22 extend between the lower perimeter and upper perimeter frame members 12, 24.

Seed container support shields 26 are located in the corners of the upper frame 16, and at the intersection of the upper perimeter frame members 24 and inner upper support members 25. In this manner, the container support shields 26 support each corner of the four bulk seed containers that rest on the upper support members 24, 25. Further support for the bulk seed containers is provided by rails 28, which connect between the container support shields 26 to further define the perimeter of the space provided for each for the four bulk seed containers.

An auger tube 30 is provided to contain an auger (not shown) that will convey and deliver the seed from the bulk seed containers to an agricultural planter (not shown). The auger tube 30 is in two sections by a hinge 31 to allow the auger tube 30 to move between a transport and an operational position. A support 36 may support the lower section of the auger tube in an inclined orientation in both positions. A hinge bracket 32 supports the two sections of the auger tube 30 in the operational position, and a support stand 34 supports the upper section of the auger tube 30 in the transport position. The auger tube 30 terminates at its lower end at auger tube funnel 38. The auger tube funnel 38 is the low point of the auger assembly and is connected to feed tubes 46 located in each of the four quadrants of the upper frame 16 of the seed cart 10. In other words, the feed tubes 46 are located in a position to receive seed from the bottom of each of the bulk seed containers, where the seed is gravity feed to the common auger tube funnel 38 for conveyance through the auger tube 30 to the agricultural planter.

FIG. 2 shows an embodiment of the seed cart 10 that differs only in that it includes fenders 44 and a trailer yoke 42. The seed cart 10 shown in FIG. 2 is adapted for use as a stand-alone trailer. Wheels and axles can be attached, as well as a trailer hitch, enabling the seed cart 10 to be towed to and from a working location.

Figure 3A:
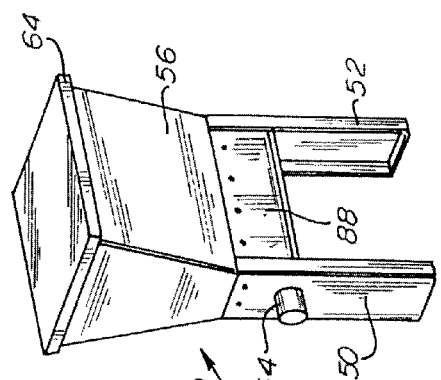
FIG. 3a is a perspective view of a talc kit for use with the seed cart of the present invention.
Figure 3B:
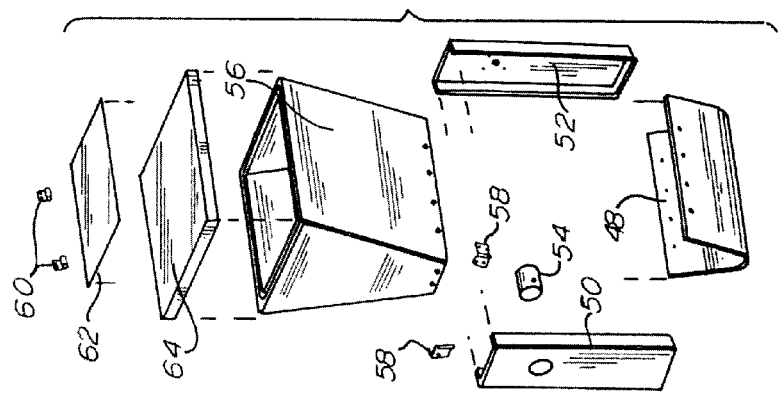

FIG. 3 shows in detail a talc kit 40 of the seed cart 10. The kit 40 dispenses talc in connection with the operation of the seed cart to allow the seed to release freely, especially if the seed has been coated with substances such as insecticides. The kit 40 includes a front and rear hopper legs 50, 52 which mount to a hopper bottom 48. The hopper bottom 48 is secured to hopper top 56. A grate 62 secured within the hopper top 56 with brackets 60. Also, provided is an auger outlet 54 which mounts to the hopper bottom 48 through a hole in the front leg 50. The talk kit 40 dispenses talc via an auger (not shown) located in the hopper bottom 48 and secured with bearing brackets 58. The auger delivers talc to the auger tube 30 at its base where the auger funnels 38 join the auger tube 30.

An additional embodiment of the seed cart 10 is shown in FIGS. 4-11.

The embodiment shown in FIG. 4 provides supports for six bulk seed containers (not shown) such as Pro-Box bulk seed containers.

Starting from the front of the seed cart 10 at the left of FIG. 4, a yoke 70 comprises a side support 72 with cross member 74 terminating in a pin 82 for connecting to a matching hitch on a truck (not shown). Additional supporting structure comprises an upright support 76, a diagonal support 78, and a gusset 80.

The frame 84 of the seed cart 10 comprises a lower frame 86 and an upper frame 88. The lower frame 86 further comprises a lower frame perimeter member 90 and a lower frame cross member 92. The upper frame 88 further comprises an upper frame perimeter member 96, an upper frame cross member 98, and an upper frame center support 100. The wheels 110 may support the frame 84 off of the ground, and the fenders 108 may be mounted on the frame 84, such as on the lower frame perimeter member 90.

One or more horizontal supports 94 are connected between the lower frame 86 and the upper frame 88.

Each of the locations supporting a bulk seed container further comprises seed container support plates 102 and seed container support rails 104. It will be understood that the seed container support plates 102 and seed container support rails 104 cooperate to provide strong support to the seed container (not shown).

Figure 11:
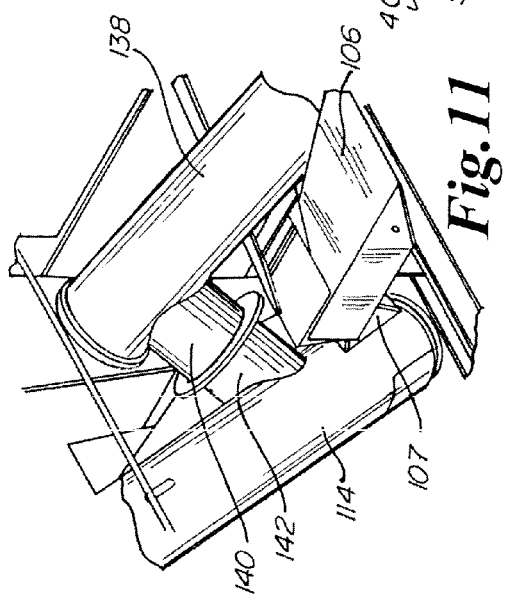
FIG. 11 is a detailed view of the area A of FIG. 4.
Figure 10:
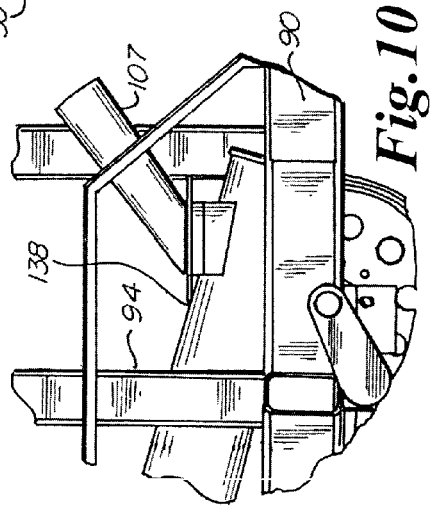
FIG. 10 is a detailed view of the area C of FIG. 6.

At each location supporting a bulk seed container, a feed tube 106 receives seed from the seed container. As best seen in FIGS. 10 and 11, at the rear of the cart, downward-sloping delivery tubes 107 deliver seed from the feed tubes 106 to a rear auger tube funnel 138. An auger (not shown) in the rear auger tube tunnel 138 carries seed upwardly and forwardly through an auger tube funnel connector 140 and conjoined auger tube connector 142 to the auger tube 114.

The auger tube 114 is in two sections by a hinge 122 to allow the auger tube 114 to move between a transport and an operational position. A hinge bracket 116 supports the two sections of the auger tube 114 in the operational position, and a support stand 118 supports the upper section of the auger tube 114 in the transport position. An auger support 120 and auger bracket 124 provide support to the fixed portion of the auger tube 114.

In this manner, the present invention substantially eliminates the problems of previous seed carts.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. Those of ordinary skill in the art that have the disclosure before them will be able to make modifications and variations therein without departing from the scope of the invention.

What is claimed:

1. A vehicle for transporting bulk seed containers and for transferring seed from the bulk seed containers to a seed planting machine, the vehicle comprising:
    a frame including upper and lower frame portions;
    a plurality of bulk seed container supports attached to the upper frame portion of the frame, each of the plurality of bulk seed container supports being adapted to support a said bulk seed container;
    a weighing apparatus positioned between the upper frame portion and the lower frame portion to measure a weight of any contents of one or more bulk seed containers supported on the bulk seed container supports;
    a feed tube connected to each of the plurality of bulk seed container supports for engaging a said bulk seed container when positioned on the bulk seed container;
    a delivery tube connected to each feed tube;
    a funnel commonly connected to the plurality of delivery tubes;
    an auger tube further comprising a first end connected to the funnel and a second end, the auger tube further comprising an auger adapted to transfer seed to a said seed planting machine; and
    wherein the upper and lower frame portions are separate structures connected together by the weighing apparatus.

2. The vehicle of claim 1, wherein a first portion of the auger tube is connected to the funnel and a second portion of the auger tube is hingedly connected to the first portion.

3. The vehicle of claim 1, further comprising a plurality of second bulk seed container supports attached to the frame;
    a second feed tube connected to each of the plurality of second bulk container supports;

a second delivery tube connected to each second feed tube;
a second funnel commonly connected to the plurality of second delivery tubes; and
a second auger tube having a first end connected to the second funnel and a second end connected to the auger tube.

4. The vehicle of claim 1, further comprising a talc kit having a hopper containing talc and an auger outlet adapted to transfer the talc to the auger tube.

5. The vehicle of claim 1, further comprising wheels attached to the frame and a trailer hitch attached to the frame.

6. The vehicle of claim 1, additionally comprising a fifth wheel hitch mounted on the front of the frame and configured to engage a fifth wheel.

7. The vehicle of claim 6, wherein the fifth wheel hitch comprises a yoke extending forwardly from the frame, and a pin mounted on a forward end of the yoke.

8. The vehicle of claim 1, wherein at least one of the bulk seed container supports comprises an upper perimeter frame member and a plurality of container support shields proximate to the perimeter frame member, at least one of the container support shields comprising a substantially vertically-oriented lower first portion extending upwardly from the upper perimeter frame member and an upper second portion extending upwardly and outwardly from the lower portion.

9. The vehicle of claim 8, wherein the at least one container support shield further includes a third portion extending upwardly from the second portion, the third portion being substantially vertically-oriented in a substantially parallel relationship to the first portion of the at least one container support shield.

10. The vehicle of claim 8, wherein the plurality of container support shields are separate from each other and are located toward positions of corners of a bulk seed container when the container is positioned on the upper perimeter frame member.

11. The vehicle of claim 1, wherein the weighing apparatus includes a readout configured to indicate a weight measured by the weighing apparatus.

12. The vehicle of claim 1, wherein the weighing apparatus includes multiple weigh bars forming a primary connection between the upper and lower frame portions.

13. The vehicle of claim 1, wherein the plurality of bulk seed container supports, the funnel, the feed tube, the delivery tube and the auger tube are mounted on the upper frame portion such that the weighing apparatus is configured to weigh seed contained in parts mounted on the upper frame portion and any supported bulk seed containers.

14. A vehicle for transporting bulk seed containers and for transferring seed from the bulk seed containers to a seed planting machine, the vehicle comprising:
a frame including upper and lower frame portions;
a primary support apparatus for supporting a first cluster of said bulk seed containers, the primary support apparatus including:
   a plurality of first bulk seed container supports attached to the upper frame portion of the frame, each of the plurality of first bulk seed container supports being adapted to support a said bulk seed container;
   a weighing apparatus positioned between the upper frame portion and the lower frame portion to measure a weight of any contents of one or more bulk seed containers supported on the bulk seed container supports;
   a first feed tube connected to each of the plurality of bulk seed container supports and positioned to engage a said bulk seed container supported on the respective first bulk seed container supports;
   a downwardly-sloping first delivery tube connected to each first feed tube;
   a first funnel commonly connected to the plurality of delivery tubes;
   a primary auger tube having a first end connected to the first funnel, the primary auger tube including a first portion connected to the first funnel and fixedly mounted on the frame, the primary auger also including a second portion pivotally connected to the first portion to permit movement of the second portion between a storage position and a use position; and
wherein the upper and lower frame portions are separate structures connected together by the weighing apparatus.

15. The vehicle of claim 14, additionally comprising a secondary support apparatus for supporting a second cluster of said bulk seed containers, the secondary support apparatus including:
   a plurality of second bulk seed container supports attached to the frame;
   a second feed tube connected to each of the plurality of second bulk container supports and positioned to engage a said bulk seed container supported on the respective second bulk seed container supports;
   a second delivery tube connected to each second feed tube;
   a second funnel commonly connected to the plurality of second delivery tubes; and
   a secondary auger tube having a first end connected to the second funnel and a second end connected to the primary auger tube toward the first end of the primary auger tube to receive seed from the second cluster of said bulk seed containers supported by the secondary support apparatus.

16. The vehicle of claim 14, additionally comprising a fifth wheel hitch mounted on the front of the frame and configured to engage a fifth wheel.

17. A vehicle for transporting bulk seed containers and for transferring seed from the bulk seed containers to a seed planting machine, the vehicle comprising:
a frame having an upper frame portion and a lower frame portion;
a weighing apparatus positioned between the upper frame portion and the lower frame portion to measure a weight of any contents of one or more bulk seed containers supported on bulk seed container supports, the upper and lower frame portions being separate structures connected together by the weighing apparatus;
a primary support apparatus on the upper frame portion for supporting a first cluster of said bulk seed containers, the primary support apparatus including:
   a plurality of said bulk seed container supports attached to the frame, each of the plurality of bulk seed container supports being adapted to support a said bulk seed container;
   a first feed tube connected to each of the plurality of bulk seed container supports and positioned to engage a said bulk seed container supported on the respective bulk seed container supports;
   a downwardly-sloping first delivery tube connected to each first feed tube;
   a first funnel commonly connected to the plurality of delivery tubes;
a secondary support apparatus on the upper frame portion for supporting a second cluster of said bulk seed containers, the secondary support apparatus including:

a plurality of said bulk seed container supports attached to the frame;

a second feed tube connected to each of the plurality of said bulk container supports and positioned to engage a said bulk seed container supported on the respective bulk seed container supports;

a second delivery tube connected to each second feed tube;

a second funnel commonly connected to the plurality of second delivery tubes; and a secondary auger tube having a first end connected to the second funnel and a second end;

a primary auger tube having a first end connected to the first funnel, the second end of the secondary auger tube being connected to the primary auger tube toward the first end of the primary auger tube to receive seed from the second cluster of bulk seed containers supported by the secondary support apparatus; and a talc kit configured to dispense talc into seed moving in one of the auger tubes, the talc kit including a hopper containing a supply of talc and an auger in communication with the hopper and said one of the auger tubes to permit the auger to transfer the talc from the hopper to the primary auger tube.

\* \* \* \* \*